United States Patent [19]

Long

[11] 4,116,159
[45] Sep. 26, 1978

[54] SUBSTRATE PASSES THROUGH POOL CONFINING WALL COATING APPARATUS

[75] Inventor: Delmar D. Long, Rock Hill, S.C.

[73] Assignee: M. Lowenstein & Sons, Inc., New York, N.Y.

[21] Appl. No.: 790,659

[22] Filed: Apr. 25, 1977

[51] Int. Cl.² ............................................. B05C 3/12
[52] U.S. Cl. ................................... 118/34; 118/405
[58] Field of Search ............... 118/50, 50.1, 404, 405; 427/434 R, 434 B

[56] References Cited

U.S. PATENT DOCUMENTS

| | | | |
|---|---|---|---|
| 2,193,861 | 3/1940 | Crowley | 427/434 B |
| 2,905,522 | 9/1959 | Fahringer | 118/405 X |
| 3,503,371 | 3/1970 | Meyers et al. | 118/405 |
| 3,559,619 | 2/1971 | Johnson | 118/405 X |
| 3,722,899 | 3/1973 | Sedwell | 118/405 X |

FOREIGN PATENT DOCUMENTS 282,056  12/1970  U.S.S.R. .................................. 118/405

Primary Examiner—Morris Kaplan
Attorney, Agent, or Firm—L. J. Wilburn, Jr.; W. M. Manning, Jr.

[57] ABSTRACT

Method and apparatus for coating a moving porous web with viscous coating material, particularly for coating bias-cut, woven fabric with a tacky neoprene composition, to fill the interstices and uniformly coat the faces thereof, comprising a tenter frame for moving the fabric in a horizontal path of travel while maintaining it in dimensional stretched configuration. A pair of coating heads having opposed discharge manifolds positioned above and below the path of movement of the fabric on the tenter frame are supplied with viscous coating material which is applied to the moving fabric. The fabric is dried after each coating application and subsequently collected for use as reinforcement in the rubber cores of V-belt contructions. Each manifold of the first coating head includes a central vertical wall having edges which are in opposed relation to contact the coated fabric and force the coating material into the fabric interstices and fiber bundles of the yarns, thereby ensuring full penetration of the coating into the interior portions of the fabric. The first coating head also applies a uniform surface coating to upper and lower faces of the fabric. The manifolds of the second coating head provide a second uniform surface coating on upper and lower faces of the fabric and exceptional weight pick-up of the tacky neoprene elastomer is obtained. Depending on the characteristics of the fabric and the coating composition, the coating heads as well as the supply of coating material thereto may be adjusted to obtain desired results.

11 Claims, 3 Drawing Figures

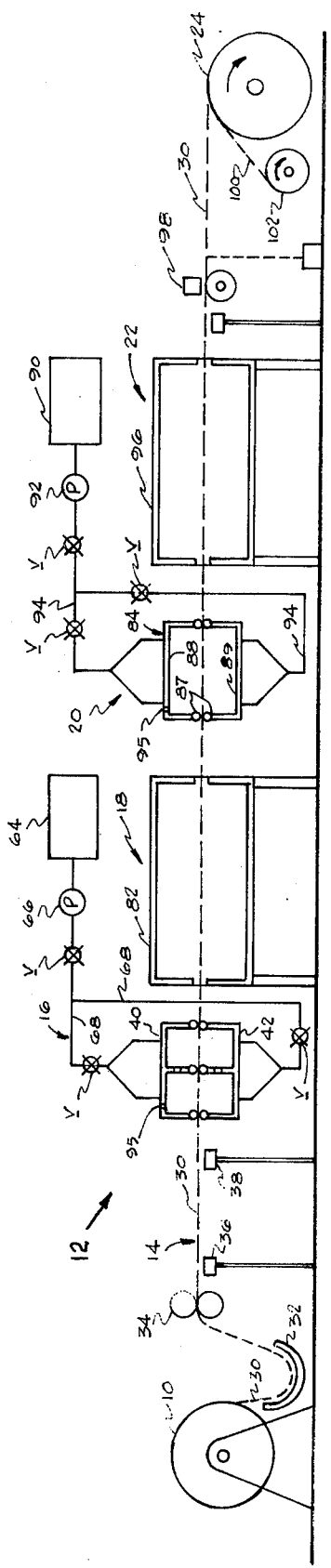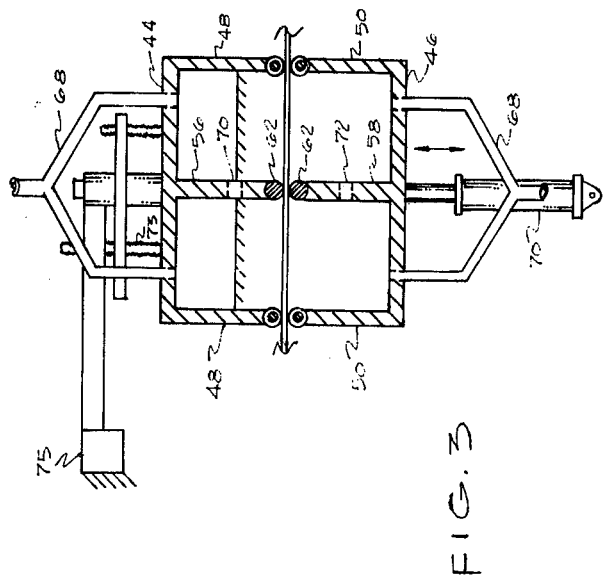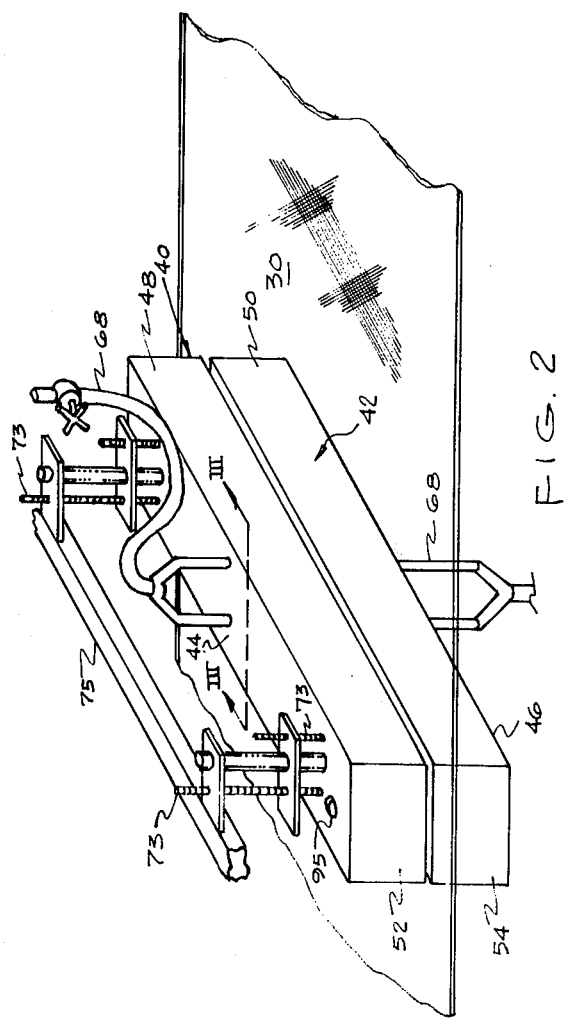

SUBSTRATE PASSES THROUGH POOL CONFINING WALL COATING APPARATUS

The present invention is directed to apparatus for coating a moving web of porous material, and more particularly to apparatus for coating a continuously moving bias-cut woven fabric with a tacky elastomeric composition to provide a coated fabric suited for use in the production of power transmission belts, such as V-belts and the like. The apparatus of the invention are particularly suited to apply maximum amounts of the viscous elastomer to the fabric by positively filling the interstices of the fabric with elastomer, and thus provide improved adhesion of the coated fabric to the rubber core of power transmission belt constructions in subsequent curing operations.

In manufacturing elastomer-coated, bias-cut woven fabrics for use in V-belt constructions, it is a practice to spirally cut a tubular woven fabric on a 45° angle to produce a continuous sheet having warp and weft threads disposed at about 45° angle to the longitudinal axis of the sheet. The sheet is stretched in widthwise direction to increase the angular relation of the warp and weft threads to the longitudinal axis of the sheet, and the stretched sheet is impregnated with an elastomeric composition which is dried to a tacified state. The coated sheet is cut into narrow strips and applied to rubber belt cores, the fabric-covered cores are cured, and the fabric serves as a reinforcement and/or protective covering in the final power belt product.

U.S. Pat. No. 3,784,427, discloses method and apparatus for manufacturing bias-cut, elastomer-coated woven fabrics wherein a binder material is applied to a bias-cut fabric, the fabric stretched in widthwise direction, the binder cured thereon to stabilize the fabric, and the binder-stabilized fabric subsequently immersion-impregnated with the elastomeric composition.

In my co-pending U.S. patent application Ser. No. 695,723 filed June 14, 1976, now U.S. Pat. No. 4,062,989, method and apparatus are described for sequentially applying a viscous coating to lower and upper faces of a moving, bias-cut woven fabric to cause penetration of the coating into the fabric interstices while smoothing the surface coatings to a uniform thickness. The coating is applied inwardly of the edges of the fabric while the fabric is held in a stretched condition on a tenter-frame, thus eliminating the necessity of a binder to stabilize the fabric. The coated fabric is then dried to a tacky state and collected for subsequent use in V-belt production.

My present invention is directed to improved apparatus of the general type described in my said co-pending application, i.e., apparatus for direct application of a tacky elastomeric coating material to a fabric maintained in stretched condition and without the need for application of a binder material to stabilize the fabric. The present apparatus permits more effective application of very large amounts of viscous elastomer per unit area of the fabric by use of a multiple, opposed application coating sequence to force the viscous elastomer into the fabric and fill the interstices, as well as penetrate the yarn bundles of the fabric. The invention includes a unique coating head which forces the viscous, elastomeric material under high pressure into the interstices and yarns of the fabric. The coating head has opposed manifolds with discharge openings positioned to simultaneously contact opposite faces of the fabric and apply the coating material onto and into the fabric while maintaining reservoirs of coating material on both fabric faces. Each manifold has a central vertical wall extending across the path of movement of the fabric to divide the manifold into two compartments. The central walls of the manifolds are positioned so that their opposed edges press against opposite faces of the fabric to force viscous coating material under extremely high pressure into the interstices and yarns as the web moves therebetween.

It is therefore an object of the present invention to provide improved apparatus for coating a moving porous web of material with a viscous coating composition to fill the interstices of the web with the composition and provide increased pick-up of the composition on the web.

It is more specific object of the invention to provide an improved apparatus for coating a moving bias-cut, woven fabric with a tacky elastomeric composition while the fabric is maintained in transversely stretched condition, and wherein improved impregnation of the interstices and yarn bundles of the fabric can be obtained to facilitate its subsequent adhesion to rubber cores of power transmission belts, and the like.

It is further specific object of the invention to provide an improved apparatus for coating a moving bias-cut, woven fabric with an elastomeric composition, while the fabric is maintained in transversely stretched condition, by a two coat application with intermmediate drying to provide improved impregnation and pick-up of coating material on the fabric.

The above, as well as other objects of the invention, will become more apparent and the invention will be better understood from the following detailed description of a preferred embodiment of the invention, when taken in connection with the accompanying drawings, in which:

FIG. 1 is a schematic side elevation view of apparatus for coating a moving fabric sheet, while in transversely stretched condition, with a tacky elastomeric composition and employing novel features of the present invention;

FIG. 2 is an enlarged perspective view of the first of the coating heads of the apparatus of FIG. 1 for applying viscous coating material to the moving fabric; and FIG. 3 is a sectional elevation view taken generally along line III—III of FIG. 2 to better show the interior and overall construction of the coating head.

Referring more particularly to the drawings, FIG. 1 shows coating apparatus of the present invention which comprises, in general, a fabric supply roll 10, a tenter frame 12 having a fabric stretching section 14, a first fabric coating section 16, a first drying section 18, a second fabric coating section 20, and a second drying section 22, and a fabric take-up roll 24. The tenter frame 12 may be of conventional pin tenter chain-type well-known in the textile art. Tenter 12 has spaced moving chains provided with pins to supportably engage the side edges of a fabric to transport the fabric through the tenter. As is well-known, sections of the chains may be angularly adjusted to stretch the fabric in widthwise direction during its horizontal movement on the tenter, and stretching section 14 is provided for this purpose.

In operation as shown, an indefinite length sheet of bias-cut woven fabric 30 is continuously supplied to stretching section 14 of the tenter from supply roll 10. As previously indicated, such fabric may be produced in known manner, by spirally cutting a tubular woven fabric at 45° angle to provide a continuous length sheet having warp and weft threads disposed at right angles to each other and at approximately a 45° angle to the longitudinal axis of the sheet. Fabric from supply roll 10 passes means of a scray 32 and feed rolls 34 which overfeed the fabric onto the pins of the tenter by a desired amount. The chains of stretching section 14 are angularly adjusted about pivot points, indicated schematically at 36,38, to stretch the fabric in widthwise direction during its longitudinal movement and thereby increase the angular relationship of the warp and weft threads by a desired amount. Typically, in producing bias-cut, woven fabrics for V-belt constructions, the fabrics are stretched in section 14 of the tenter to increase the angle between the warp and weft threads from about 90° to approximately 120°, and the overfeed of the fabric onto the chains is set accordingly. After stretching, the fabric sheet is transported while maintained in stretched condition in a generally horizontal path through the coating and drying sections of the frame, as will be described.

As best seen in FIGS. 2 and 3, first coating section 16 of the tenter frame comprises a coating head composed of a pair of elongate manifolds 40,42 disposed above and below the path of travel of the fabric. The manifolds extend across the fabric path and terminate within the side edges of the fabric and support chains to provide coating material to the upper and lower faces of the fabric while ensuring that the tenter chains remain free from contact and contamination by the tacky elastomeric coating material. As best seen in FIG. 3, the upper and lower manifolds 40,42 are of generally similar construction with exterior horizontal walls 44,46 and vertical side walls 48,50 which extend across the fabric path in horizontally spaced parallel relation. The ends of the manifolds are closed by vertical end walls, two of which 52,54 are seen in FIG. 2. Positioned centrally between the side walls of each manifold is an interior vertical wall 56,58 which extends parallel to the side walls to divide each manifold into two compartments for receiving coating material.

As seen in FIG. 3, the bottom of upper manifold 40 and top of lower manifold 42 are open to form opposed elongate discharge openings for application of coating material to opposite faces of the fabric. The opposed edges of the exterior side and end walls of the manifolds define the perimeter of the discharge and are provided with a generally semi-circular groove in which a tubular gasket 60 is disposed. As shown, the edges of the exterior walls engage opposed upper and lower face portions of the fabric so that excess coating material does not escape from the compartments during the coating operation. Various gasket material may be employed to effectively seal the manifolds against leakage of excess coating material during the coating operation. In the embodiment shown in FIG. 3, the opposed grooved edges of the exterior walls of the manifolds are provided with a tube of resiliently deformable material, such as a Teflon tube filled with plastic foam. The Teflon tubes are suitably secured in the grooves, as by screws or rivets, not shown, and directly engage opposite face portions of the fabric to maintain a seal therewith.

As also seen in FIG. 3, the opposed edges of the central vertical walls 56,58 of each manifold are also provided with a semi-circular groove in which a solid rod of substantially rigid construction, such as a solid Teflon rod 62 is positioned. The rods 62 form rigid opposing curved edges which engage the fabric during its passage between the manifolds. The rods thus serve to force the coating material on the surface of the fabric into the interstices of the fabric under high pressure to ensure full penetration and filling of the interstices by the viscous coating material.

The compartments of each manifold are supplied with viscous elastomeric material, such as a neoprene composition, from a supply tank 64 by pump means 66 and suitable conduits 68. The two compartments of each manifold communicate by openings 70,72 in the central wall members of the manifold to maintain uniform pressure in both compartments during the coating operation.

Depending on the thickness of the web, and the desired pick-up of the coating material thereon, the position of the manifolds of the coating head may be adjusted to accommodate web materials of various thickness and degrees of porosity. As shown in FIGS. 2 and 3, the first coating head is provided with means for adjustably positioning the upper and lower manifolds relative to the path of movement of the fabric. The manifold 40 of the coating head is supportably attached by adjusting screws 73 and brackets to a support bar 75 of the tenter frame. The lower manifold 42 of the coating head is vertically positionable by a pair of pneumatic pistons, one of which 76 is shown in FIG. 3, attached by suitable means to the tenter support frame (not shown). Thus, the opposed edges of the manifolds of the coating head may be accurately positioned to accommodate webs of varying thickness and ensure that excess coating material does not escape from the heads during the coating operation. By means of the pneumatic pistons, a desired pressure is exerted on the opposed faces of the fabric by the central vertical wall edges 62 to impart the necessary force to fully penetrate the coating material into the interstices and the yarn bundles of the fabric.

Positioned immediately downstream of the first coating section 16 in the path of movement of the fabric is first drying section 18. A dryer 82 of conventional construction and employing a suitable heating means such as heated forced air is regulated to dry the neoprene coating on the fabric to a tacky state.

The fabric containing the first neoprene coating thereon then passes through a second coating head 84 comprising a pair of manifolds of generally similar construction to the first coating head. A second surface coating of the neoprene composition is applied simultaneously to the upper and lower faces of the fabric. As best seen in FIG. 1, the vertical exterior walls of the second coating head have grooved edge portions provided with a flexible Teflon tube 87 filled with foam plastic which serves as sealing means to prevent escape of excess coating material during the second coating operation.

Coating material is supplied to the two manifolds 88,89 from supply tank 90 by diaphragm pump 92 and conduits 94. Since the interstices of the fabric are filled with the elastomeric coating by pressure of the opposed edges of the central walls 56,58 of the manifolds of the first coating head, it has been found that for most applications, central wall pressure is not required in the second coating head application. Instead, the manifolds of the second coating head are adjusted to apply a second surface coating on both faces of the fabric to obtain a maximum pick-up of material on the fabric, and the second coatings are smoothed to a uniform thickness by the Teflon gaskets as the fabric exits from the coating head. In some applications, depending upon fabric mesh and density and upon characteristics and viscosity of the coating material, the second coating head may be identical to the first coating head to achieve desired results in the coated fabric product. Both coating heads are provided with vent openings 95 in the upper manifold to permit escape of air during charging of the heads with coating material.

Downstream of the second coating station is a second dryer 96 where the fabric is again heated to dry the second coating thereon.

The tacky, coated fabric leaving the tenter frame is directed past a cutting station where the uncoated side edges of the fabric are cut from the fabric by suitable cutting means 98 to provide a full width, coated fabric for collection on roll 24. Since the coated fabric is quite tacky after drying, it is desirable to insert a separator sheet 100 of plastic between the collected layers of fabric, and a supply roll 102 is positioned to introduce the sheet 100 between the coated fabric layers as the fabric is collected.

Depending on the characteristics of the web and the coating material, supply of coating material to the coating heads may be varied. For example, if a web of relatively open mesh, or high porosity, is to be coated, it may be desirable to supply coating material only through conduits leading to the bottom manifold, such that the coating material passes upwardly through the web to form a reservoir of coating material in the upper manifold compartments, as illustrated in FIG. 3. However, if the web is of low proosity, i.e., a woven fabric having a close mesh, or weave, or if the viscosity of coating material is so high as to be difficult to pass through the web interstices, coating material is supplied through the conduits simultaneously to upper and lower manifold compartments.

By providing two coating and drying steps in the coating process, larger amounts of the coating composition can be effectively attached to the fabric. Since the neoprene composition is applied in a liquid carrier and the carrier liquid removed in drying, the coating necessarily shrinks on the fabric during drying. Thus, by applying a second coating after the first coating is dried, a greater solids pick-up can be obtained.

Use of the apparatus of the present invention may be illustrated by the following specific example involving the coating of a bias-cut, woven fabric with a neoprene elastomer.

EXAMPLE

A roll of bias-cut, woven fabric containing yarns of 50% cotton/50% polyester weighing approximately 7.5 oz. per square yard and having a 35 by 35 yarn pick count is passed from the supply roll 10 and overfed by the nip rolls 34 onto the tenter pins of the stretching section of the tenter frame where the fabric is transversely stretched to reorient the warp and weft threads to approximately a 120° angle. The stretched fabric passes in stretched condition through the first coating head where an aqueous neoprene composition having a viscosity of approximately 14,000 cps. and containing approximately 45% solids is supplied to the upper and lower manifolds. The supply conduit valves V are regulated to maintain a level of coating material in upper and lower manifold compartments to ensure that coating material is at all times in contact with both faces of the fabric.

The manifolds are set and the pistons adjusted in the first coating head so that the edges of the central walls of the manifolds apply approximately 40,000 PSIG to the fabric to force the coating deeply into the interstices as well as between the individual filaments and fibers of the yarns. Coating material applied to opposed faces of the fabric in the second compartments of the manifolds is smoothed by the exterior wall edges as the fabric leaves the coating head. The coated fabric is dried in the forced air dryer 82 to remove the water and thereafter passed into the second coating head where the neoprene composition is again applied to the surfaces of the coated fabric.

The smoothed second coating is dried on the fabric in the second dryer 92 to remove the water from the coating composition. The uncoated edges of the coated fabric are removed by edge cutting devices 98, and the fabric collected with a plastic separation sheet on collection roll 24.

The resultant fabric, which has a dry weight pick-up of coating material of approximately 100%, based on dry weight of the fabric, remains in a tacky state until it is subsequently cut into narrow strips and applied to rubber cores of belt constructions which are cured to form the final transmission belt product.

That which is claimed is:

1. Apparatus for applying viscous coating material to a longitudinally moving porous web to fill the interstices and coat the faces thereof, comprising means for moving an indefinite length porous web in a generally horizontal path of travel, viscous material applicator means comprising a coating head having a pair of elongate manifolds for containing viscous coating material, said manifolds positioned respectively above and below said path of travel to engage the web, each manifold having an elongate sealing opening extending across said web path with said openings positioned in opposed relation to apply viscous coating material onto the opposite face portions of the web as it passes between the manifolds, means for introducing a viscous coating material into the manifolds to coat upper and lower faces of the moving web, and edge means positioned generally centrally in each of said manifolds and extending across said path to contact opposite face portions of the web during its movement between the manifolds and force coating material on the surfaces of the web into the interstices thereof.

2. Apparatus as defined in claim 1 wherein said edge means comprises central vertical wall means in each manifold dividing the manifold into two compartments for containing coating material, the edge of each wall means being of generally semi-circular configuration in cross section and the edges positioned in opposed relation extending along said elongate openings, and means for applying a selectively variable pressure on said manifolds to produce a predetermined pressure of said edges on the web passing between the manifolds to force the coating material into the interstices thereof.

3. Apparatus as defined in claim 2 wherein each of said manifolds includes exterior walls having edges and flexible gasket means attached to said edges defining said elongate sealing opening and engaging the moving web to prevent loss of excess coating material from the manifolds during movement of the web therebetween.

4. Apparatus as defined in claim 3 wherein said edges of said exterior walls have a semi-circular groove therein, and said flexible gasket means comprises a flexible tube having a low surface coefficient of friction and disposed in said grooves for contacting the faces of the web to prevent loss of excess coating material from the manifolds.

5. Apparatus as defined in claim 3 wherein said means for applying a selectively variable pressure on said manifolds comprises means for adjustably positioning one of the manifolds relative to the path of movement of the web, and means for applying a predetermined pressure against said other manifold to produce resultant pressure of said flexible gasket means against the web during its movement through the coating head.

6. Apparatus as defined in claim 5 wherein said pressure applying means comprises pneumatic piston means attached to the lower of said manifolds to position it vertically with respect to the path of travel of the web.

7. Apparatus as defined in claim 1 wherein said means for introducing a viscous coating material into the manifolds comprises a viscous material supply tank, conduit means connecting said supply tank to the interior of said manifolds, and valve means positioned in said conduits for regulating the flow of viscous material to the manifolds.

8. Apparatus as defined in claim 1 wherein said means for moving the web in a generally horizontal path of travel comprises a tenter frame including web edge-engaging means for moving a web in longitudinal direction along said path while maintaining it in transversely stretched condition, and wherein ends of said manifolds extending across said path terminate within the distance between said web edge-engaging means to avoid coating of side edges of the web and contamination of said tenter frame edge-engaging means by viscous coating material.

9. Apparatus as defined in claim 2 wherein each of said central vertical wall means includes a central vertical wall having a semi-circular groove in its edge portion, and a rigid rod disposed in said semi-circular groove to form said wall means edges which contact opposite surfaces of the web passing between the manifolds.

10. Apparatus as defined in claim 9 wherein said central vertical wall of each manifold includes an opening therethrough communicating said two compartments to equalize pressure of coating material contained therein.

11. Apparatus as defined in claim 4 wherein the upper of said manifolds includes a vent opening provided for removal of air during charging of said manifolds with viscous coating material.

* * * * *